(12) United States Patent
Prioul et al.

(10) Patent No.: US 9,376,902 B2
(45) Date of Patent: Jun. 28, 2016

(54) METHOD TO OPTIMIZE PERFORATIONS FOR HYDRAULIC FRACTURING IN ANISOTROPIC EARTH FORMATIONS

(75) Inventors: Romain Charles Andre Prioul, Somerville, MA (US); Florian Karpfinger, Cambridge, MA (US); George Waters, Oklahoma City, OK (US); Brice Lecampion, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 665 days.

(21) Appl. No.: 13/586,712

(22) Filed: Aug. 15, 2012

(65) Prior Publication Data

US 2013/0206475 A1    Aug. 15, 2013

Related U.S. Application Data

(60) Provisional application No. 61/524,042, filed on Aug. 16, 2011.

(51) Int. Cl.
*G01V 1/50* (2006.01)
*E21B 43/26* (2006.01)
*E21B 43/263* (2006.01)
*E21B 43/119* (2006.01)

(52) U.S. Cl.
CPC ............... *E21B 43/26* (2013.01); *E21B 43/119* (2013.01); *E21B 43/263* (2013.01)

(58) Field of Classification Search
CPC ....... E21B 43/26; E21B 43/119; E21B 47/02; E21B 49/006
USPC .............................. 367/25; 166/250.01, 308.1
See application file for complete search history.

(56) References Cited

U.S. PATENT DOCUMENTS

| | | | |
|---|---|---|---|
| 3,917,349 A * | 11/1975 | Cleary, Jr. ...................... 299/13 |
| 5,111,881 A | 5/1992 | Soliman et al. |
| 5,318,123 A * | 6/1994 | Venditto et al. ............ 166/250.1 |
| 5,335,724 A | 8/1994 | Venditto et al. |
| 5,355,802 A | 10/1994 | Petitjean |
| 5,360,066 A | 11/1994 | Venditto et al. |
| 6,378,607 B1 | 4/2002 | Ryan et al. |
| 6,508,307 B1 | 1/2003 | Almaguer |
| 6,714,480 B2 | 3/2004 | Sinha et al. |
| 6,718,266 B1 | 4/2004 | Sinha et al. |
| 7,000,699 B2 | 2/2006 | Yang et al. |
| 8,117,014 B2 | 2/2012 | Prioul et al. |
| 2004/0176911 A1* | 9/2004 | Bratton et al. .................... 702/6 |
| 2009/0070042 A1* | 3/2009 | Birchwood et al. ............ 702/11 |
| 2009/0210160 A1 | 8/2009 | Suarez-Rivera et al. |
| 2009/0242198 A1* | 10/2009 | Evans et al. ............. 166/250.01 |
| 2010/0250214 A1 | 9/2010 | Prioul et al. |
| 2011/0029291 A1* | 2/2011 | Weng et al. ....................... 703/2 |
| 2011/0182144 A1* | 7/2011 | Gray .............................. 367/75 |

OTHER PUBLICATIONS

Almaguer, et al., "Orienting perforations in the right direction", Oilfield Review, vol. 1(1), Mar. 1, 2002, pp. 16-31.
(Continued)

*Primary Examiner* — Ian J Lobo

(57) ABSTRACT

The subject disclosure relates to determining an optimum orientation for perforations around the circumference of a subsurface borehole and optimum wellbore fluid initiation pressure for hydraulic fracturing in anisotropic formations.

20 Claims, 4 Drawing Sheets

(56) References Cited

OTHER PUBLICATIONS

Amadei, et al., "Gravitational stresses in anisotropic rock masses with inclined strata", International Journal of Rock Mechanics and Mining Sciences & Geomechanics Abstracts, vol. 29(3), May 1992, pp. 225-236.

Christiansson, et al., "ISRM Suggested Methods for rock stress estimation—Part 4: Quality control of rock stress estimation", International Journal of Rock Mechanics & Mining Sciences, vol. 40, 2003, pp. 1021-1025.

Fairhurst, C., "Methods of Determining in-Situ Rock Stresses at Great Depths.", Technical Report, TR-1-68, 1968, 447 pages.

Fairhurst, C., "Stress estimation in rock: a brief history and review", International Journal of Rock Mechanics and Mining Sciences, vol. 40(7-8), 2003, pp. 957-973.

Gaede, et al., "Comparison between analytical and 3D finite element solutions for borehole stresses in anisotropic elastic rock", International Journal of Rock Mechanics and Mining Sciences, vol. 51, Apr. 2012, pp. 53-63.

Haimson, et al., "ISRM Suggested Methods for rock stress estimation—Part 3: hydraulic fracturing (HF) and/or hydraulic testing of pre-existing fractures (HTPF)", International Journal of Rock Mechanics & Mining Sciences, vol. 40, 2003, pp. 1011-1020.

Hiramatsu, et al., "Determination of the stress in rock unaffected by boreholes or drifts, from measured strains or deformations", International Journal of Rock Mechanics and Mining Sciences & Geomechanics Abstracts, vol. 5, 1968, pp. 337-353 (Ordered).

Hiramatsu, et al., "Stress around a shaft or level excavated in ground with a three-dimensional stress state", Kyoto Teikoku Diagaku Koka Daigaku kiyo, 1962, p. 56.

Hossain, et al., "Hydraulic fracture initiation and propagation: roles of wellbore trajectory, perforation and stress regimes", Journal of Petroleum Science and Engineering, vol. 27(3-4), Sep. 2000, pp. 129-149.

Hudson, et al., "ISRM Suggested Methods for rock stress estimation—Part 1: Strategy for rock stress estimation", International Journal of Rock Mechanics & Mining Sciences, vol. 40, 2003, pp. 991-998.

Karpfinger, et al., "Revisiting Borehole Stresses in Anisotropic Elastic Media: Comparison of Analytical Versus Numerical Solutions", 45th U.S. Rock Mechanics/Geomechanics Symposium, San Francisco, California, 2011, 10 pages.

Manrique, et al., "Oriented Fracturing—A Practical Technique for Production Optimization", SPE Annual Technical Conference and Exhibition, New Orleans, Louisiana, 2001, p. 10.

Peska, et al., "Compressive and tensile failure of inclined well bores and determination of in situ stress and rock strength", Journal of geophysical Research, vol. 100, 1995, p. 791.

Prioul, et al., "Improving Fracture Initiation Predictions on Arbitrarily Oriented Wells in Anisotropic Shales", Canadian Unconventional Resources Conference, Alberta, Canada, 2011, 18 pages.

Sjoberg, et al., "ISRM Suggested Methods for rock stress estimation—Part 2: overcoring methods", International Journal of Rock Mechanics & Mining Sciences, vol. 40, 2003, pp. 999-1010.

Thiercelin, et al., "A Core-Based Prediction of Lithologic Stress Contrasts in East Texas Formations", SPE Formation Evaluation, vol. 9(4), Dec. 1994, pp. 251-258.

Yew, Ching H., "Mechanics of Hydraulic Fracturing", Gulf Professional Publishing, 1997, 183 pages.

Kirsch, "The Theory of Elasticity and the Requirements of the Science of the Science of the Strength of Materials," Lecture presented at the 39th general meeting of the Association of German Engineers at Chemnitz on Jun. 8, 1898, Zeitschrift des Vereines Deutscher Ingenieure, No. 29, Saturday, Jul. 16, 1898, vol. 42, pp. 797-804 (42 pages).

Aadnoy, "Modeling of the Stability of Highly Inclined Boreholes in Anisotropic Rock Formations", SPE Drilling Engineering, Sep. 1988, pp. 259-268.

Karpfinger et al., "Revisiting borehole stresses in anisotropic elastic media: comparison of analytical versus numerical solutions", ARMA 11-273, American Rock Mechanics Association, 2011, 10 pages.

Suarez-Rivera et al., "Unlocking the Unconventional Oil and Gas Reservoirs: The Effect of Laminated Heterogeneity in Wellbore Stability and Completion of Tight Gas Shale Reservoirs", Offshore Technology Conference, OTC 20269, 2009, 12 pages.

\* cited by examiner

METHOD TO OPTIMIZE PERFORATIONS FOR HYDRAULIC FRACTURING IN ANISOTROPIC EARTH FORMATIONS

RELATED APPLICATIONS

This application claims the benefit of a related U.S. Provisional Application Ser. No. 61/524,042 filed Aug. 16, 2011, entitled "METHOD TO OPTIMIZE PERFORATIONS FOR HYDRAULIC FRACTURING IN ANISOTROPIC EARTH FORMATIONS," to Romain Prioul et al., the disclosure of which is incorporated by reference herein in its entirety.

FIELD

The subject disclosure generally relates to the field of geosciences. More particularly, the subject disclosure relates to the determination of the orientation around the circumference of a subsurface borehole and the wellbore fluid initiation pressure that is optimum for perforation operations for hydraulic fracturing in anisotropic formations.

BACKGROUND

Perforation techniques are widely used in the oil and gas industry both for enhancing hydrocarbon production by minimizing sand production and for hydraulic fracture stimulation initiation. Citing a comprehensive review on the topic, "the process of optimizing stimulation treatments uses orientated perforations to increase the efficiency of pumping operations, reduce treatment failures and improve fracture effectiveness. Completion engineers develop oriented-perforating strategies that prevent sand production and enhance well productivity by perforating to intersect natural fractures or penetrate sectors of a borehole with minimal formation damage." See Almaguer et al., "Orienting perforations in the right direction", Oilfield Review, Volume 1, Issue 1, Mar. 1, 2002.

Hydraulic fractures initiate and propagate from positions around the circumference of the open borehole wall that offer the least resistance in terms of stress and rock strength conditions. If the formation material properties (e.g. elastic stiffness and strength) are isotropic and homogeneous and if the material is intact (free of natural fractures or flaws), it is generally accepted that the fracture initiation occurs at the locus around the borehole where the tensile stress is maximum. The stress conditions at the borehole wall in such formation depends on the local stress orientations and magnitudes (local principal stress tensor), the orientation of the borehole and a material property called Poisson's ratio (if the formation is assumed elastic).

One definition of an optimum perforation orientation is the orientation around the circumference of a subsurface borehole wall and the wellbore fluid initiation pressure that corresponds to the minimum principal stress at the borehole wall (rock mechanics convention is chosen here with positive compressive stress) reaching the tensile strength of the rock. Consequently, the optimum perforation orientation will ultimately lower the treatment pressure during hydraulic fracturing therefore lowering the energy requirement of a job. It will also result in a "smoother" fracture near the wellbore (i.e. less near wellbore tortuosity) in which proppant can be placed more effectively.

Perforation orientations may be designed with the following typical steps:

1. A rock property called Poisson's ratio $\nu$ is estimated along the well most commonly using compressional $V_p$ and shear $V_s$ sonic log data from formula $v=0.5(V_p^2-2V_s^2)/(V_p^2-V_s^2)$. Other methods may also be used as is known in the art.

2. The far-field stress field (or tensor), $\sigma$, and pore pressure, $P_p$, are characterized using direct or indirect stress measurements, leading to three principal stress directions and magnitudes ($\sigma_1 > \sigma_2 > \sigma_3$) in the subsurface. When one principal stress is vertical and called $\sigma_V$, the following convention is used $\sigma_H$, and $\sigma_h$ for, respectively, the maximum and minimum horizontal principal stresses. For a recent review of the existing methods, see Hudson, J. A., F. H. Cornet, R. Christiansson, "ISRM Suggested Methods for rock stress estimation Part 1: Strategy for rock stress estimation", International Journal of Rock Mechanics & Mining Sciences 40 (2003) 991998; Sjoberg, J., R. Christiansson, J. A. Hudson, "ISRM Suggested Methods for rock stress estimation Part 2: Overcoring methods", International Journal of Rock Mechanics & Mining Sciences 40 (2003) 9991010; Haimson, B. C., F. H. Cornet, "ISRM Suggested Methods for rock stress estimation Part 3: hydraulic fracturing (HF) and/or hydraulic testing of pre-existing fractures (HTPF)", International Journal of Rock and U.S. Pat. No. 8,117,014 to Prioul et al., entitled "Methods to estimate subsurface deviatoric stress characteristics from borehole sonic log anisotropy directions and image log failure directions".

3. Given known well orientation as a function of depth, defined by two angles (well azimuth and deviation), the principal stress tensor $\sigma=[(\sigma_1\ 0\ 0;\ 0\ \sigma_2\ 0;\ 0\ 0\ \sigma_3]$ can be transformed using tensor rotation into a wellbore frame for example using so-called TOH-frame stress tensor $\sigma_{TOH}=[\sigma_{xx}^{TOH}\ \sigma_{xy}^{TOH}\ \sigma_{xz}^{TOH};\ \sigma_{xy}^{TOH}\ \sigma_{yy}^{TOH}\ \sigma_{yz}^{TOH};\ \sigma_{xz}^{TOH}\ \sigma_{yz}^{TOH}\ \sigma_{zz}^{TOH}]$. The TOH (top of the hole) frame is a coordinate system tied to the tool/borehole. Hence, its x- and y-axes are contained in the plane perpendicular to the tool/borehole, and the z-axis is pointing along the borehole in the direction of increasing depth. The x-axis of the TOH frame is pointing to the top of the borehole, the y-axis is found by rotating the x-axis 90 degrees in the tool plane in a direction dictated by the right hand rule (thumb pointing in the positive z-direction). Given a known internal wellbore pressure, $P_w$, borehole stresses (or near-field) are then computed using well-known Kirsch analytical expressions, (See Ernst Gustav Kirsch. Die Theorie der Elastizitat und die Bedurfnisse der Festigkeitslehre. "Zeitschrift des Vereines Deutscher Ingenieure", 42(29):797-807, 1898; Y. Hiramatsu and Y. Oka. "Stress around a shaft or level excavated in ground with a three-dimensional stress state"; Kyoto Teikoku Daigaku Koka Daigaku kiyo, page 56, 1962; Y. Hiramatsu and Y. Oka. "Determination of the stress in rock unaffected by boreholes or drifts, from measured strains or deformations", International Journal of Rock Mechanics and Mining Sciences & Geomechanics Abstracts, volume 5, pages 337-353. Elsevier, 1968), for the total stresses at the borehole wall for an arbitrary orientation of the borehole relative to the far-field in-situ stress tensor, as follows in cylindrical coordinates:

$$\sigma_{rr}=P_w,$$

$$\sigma_{\theta\theta}=\sigma_{xx}^{TOH}+\sigma_{yy}^{TOH}-2(\sigma_{xx}^{TOH}-\sigma_{yy}^{TOH})\cos 2\theta - 4\sigma_{xy}^{TOH}\sin 2\theta - P_w,$$

$$\sigma_{zz}^{TOH}=\sigma_{zz}^{TOH}-2\nu(\sigma_{xx}^{TOH}-\sigma_{yy}^{TOH})\cos 2\theta - 4\nu\sigma_{xy}^{TOH}\sin 2\theta,$$

$$\sigma_{\theta z}=2(\sigma_{yz}^{TOH}\cos\theta - \sigma_{xz}^{TOH}\sin\theta),$$

$$\sigma_{r\theta}=\sigma_{rz}=0,$$

where ν is the Poisson's ratio, θ is the azimuthal angle around the borehole circumference measured clockwise from a reference axis (e.g. TOH). Equations to compute borehole stresses away from the borehole wall at a desired radial position into the formation are also available.

4. Then, the ideal perforation orientation for tensile initiation is found for the azimuthal position $\theta_t$ and the wellbore fluid initiation pressure $P_w^{init}$ where the minimum principal stress at the borehole wall is given by $$\sigma_t = \frac{\sigma_{zz} + \sigma_{\theta\theta}}{2} - \sqrt{\left(\frac{\sigma_{zz} - \sigma_{\theta\theta}}{2}\right)^2 + \sigma_{\theta z}^2} = -T_o + P_p,$$

where To is the tensile strength of the rock and Pp is the pore pressure.

5. Once the optimum orientation is known a perforation tool is lowered in the well. The perforation tool perforates the well in an optimum orientation obtained from the previous step.

For a stress field with one principal stress that is vertical ($\sigma_V$), we consider the special cases of well orientations where the azimuthal position $\theta_t$ is always in a principal direction:

(a) For vertical wells, the azimuthal position $\theta_t$ is the minimum hoop stress (minimum of $\sigma_{\theta\theta}$) which is always in the direction of the maximum horizontal principal stress, $\sigma_H$.

(b) For horizontal wells drilled in the direction of a principal stress direction ($\sigma_H$ or $\sigma_h$), the azimuthal position $\theta_t$ is also the one given by the minimum hoop stress (minimum of $\sigma_{\theta\theta}$), i.e. is pointing to the top of the hole if $\sigma_V$ is greater than the horizontal stress orthogonal to the borehole, or to the side of the hole if $\sigma_V$ is smaller than the horizontal stress orthogonal to the borehole.

If the well is deviated, in such a stress field the orientation is not aligned with a principal stress direction and there is no obvious solution for $\theta_t$ as it also depends on the wellbore fluid initiation pressure so the orientation is computed numerically. See Peska, P. & Zoback, M., Compressive and tensile failure of inclined well bores and determination of in situ stress and rock strength, Journal of Geophysical Research, 1995, 100, 12,791-12,811.

When the earth formation has material properties that are directions dependent, i.e. anisotropic, steps 1, 2 and 3 above are not valid anymore and depend on the anisotropy of the rock. Although some studies have been completed on the impact of the anisotropy on the borehole stress concentration (i.e. step 3), those studies have focused on the wellbore stability issues and mud weight requirements to prevent wellbore collapse (shear) and tensile fracturing (tensile), and not on a workflow to assess the best perforation orientation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In embodiments of the subject disclosure methods are disclosed to determine the optimum orientation for perforations around a circumference of a subsurface borehole and the wellbore fluid initiation pressure that is for hydraulic fracturing in anisotropic formations.

In embodiments of the subject disclosure methods are disclosed for determining a perforation orientation for hydraulic fracturing in an anisotropic earth formation. In embodiments the method comprises the steps of determining anisotropic rock properties; determining far-field stresses in the anisotropic earth formation; determining borehole stresses in the anisotropic earth formation; determining an optimum perforation orientation; and perforating a well in the determined optimum perforation orientation.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Embodiments of the subject disclosure relate to the determination of the orientation around the circumference of a subsurface borehole and the wellbore fluid initiation pressure that is optimum for perforation operations for hydraulic fracturing in anisotropic formations. In one non-limiting example, perforation operations include shaped charge perforation operations.

Embodiments of the subject disclosure comprise methods which are applicable to arbitrary well orientation, arbitrary stress field and arbitrary elastic anisotropy of a formation.

Embodiments of the subject disclosure disclose a workflow method comprising a plurality of steps for determining perforation orientations for hydraulic fracturing in anisotropic earth formations. The plurality of steps include determination of anisotropic rock properties, determination of far-field stresses in anisotropic formations, determination of borehole stresses in anisotropic formations, determination of the optimum fracture orientation and optimum initiation pressure, lowering in the well a perforation tool and perforating the well in the direction of the optimum orientation obtained from the previous steps. Anisotropic rock properties and far-field stress properties may vary along the well and borehole stresses may vary along the borehole, therefore, the step of determining the borehole stresses in anisotropic formations may be used to select the depth points of where to place perforation clusters for a given hydraulic fracturing stage in rock with similar near-wellbore stresses or similar wellbore fluid initiation pressure. Therefore, the step of determining the borehole stresses in anisotropic formations and the borehole stresses may be used to determine how to place hydraulic fracturing stages along the well.

The subject disclosure will be described in greater detail as follows. First, a number of definitions useful to understanding the subject disclosure are presented.

Figure 1:
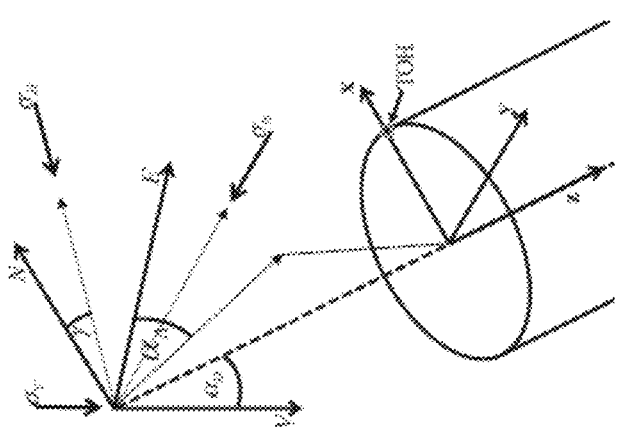
FIG. 1 illustrates a schematic of the geographic and borehole reference frames and the principal stress directions.

Definitions:
Geometry and Coordinate Systems:

In the far-field an in-situ stress field is applied where the principal stress tensor takes the form:

$$\sigma = \begin{pmatrix} \sigma_H & 0 & 0 \\ 0 & \sigma_h & 0 \\ 0 & 0 & \sigma_v \end{pmatrix}$$

where $\sigma_H$ and $\sigma_h$ are the maximum and minimum horizontal stresses, respectively, and $\sigma_v$ is the vertical stress. FIG. 1 illustrates a schematic of the geographic and borehole reference frames and the principal stress directions. The geographic reference frame is the north-east-vertical (NEV) frame whose x-axis points to the north, y-axis points to the east, and z-axis points downward in vertical direction. The borehole frame is the top-of-hole (TOH) frame whose z-axis points along the borehole in the direction of increasing depth. The x-axis is in the cross-sectional plane and points to the most upward direction, and the y-axis is found by rotating the x-axis 90° in the cross-sectional plane in a direction dictated by the right-hand rule. The orientation of the borehole is defined by the deviation angle $\alpha_D$ and the azimuth angle $\alpha_A$.

For the sake of simplicity, but without loss of generality, we assume that the vertical stress $\sigma_v$ is always aligned with the vertical component (V) of the NEV (north-east-vertical) coordinates system. The horizontal stress field can be rotated by an angle $\gamma$ measured between N (north) and $\sigma_H$ towards E (east). For the computation of the borehole stress concentration it is convenient to rotate the stress field in the NEV frame into the top-of-hole borehole coordinate system, hereafter called TOH (see definition above), i.e. $\sigma_{TOH} = [\sigma_{xx}^{TOH} \sigma_{xy}^{TOH} \sigma_{xz}^{TOH} \sigma_{xy}^{TOH} \sigma_{yy}^{TOH} \sigma_{yz}^{TOH}; \sigma_{xz}^{TOH} \sigma_{yz}^{TOH} \sigma_{zz}^{TOH}]$. The orientation of the borehole is defined by the deviation angle $\alpha_D$ and the azimuth angle $\alpha_A$.

Elasticity Equation

The strain components $\epsilon_{ij}$ are related to the stress components $\sigma_{kl}$ via the constitutive relation:

$$\epsilon_{ij} = S_{ijkl} \sigma_{kl}$$

where $S_{ijkl}$ is the fourth rank compliance tensor (and as $s_{ij}$ if the 6×6 matrix contracted Voigt notation is used). The inverse of the compliance tensor is the fourth rank stiffness tensor defined as $C_{ijkl}$ (and $c_{ij}$ in Voigt notation). Rotation of the compliance tensor into the TOH frame can be done by applying two Bond transformations to the 6×6 Voigt notation compliance matrix $s_{ij}$ giving a new matrix noted $\sigma_{ij}$.

Material Anisotropy

Figure 2:
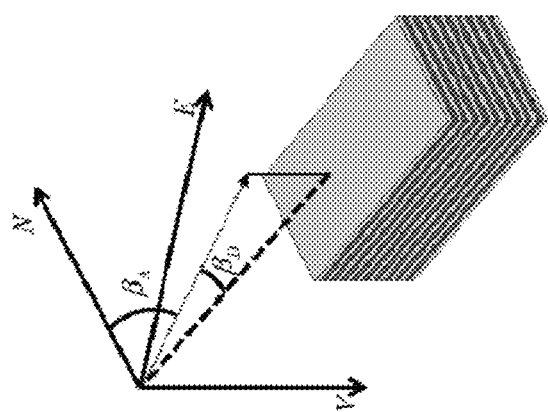
FIG. 2 illustrates the material coordinate system for a transverse isotropic medium with a tilted symmetry axis (TTI)

Embodiments of the subject disclosure use an anisotropic medium that is transversely isotropic rocks with a tilted axis of symmetry (called hereafter TTI). In general, this is the most typical type of anisotropy encountered in the Earth, although it should be understood that methods of the subject disclosure are not restricted to TI media. The TTI medium is described by five elastic constants in different notations as (a) Elasticity notation: $c_{11}$, $c_{33}$, $c_{13}$, $c_{44}$ and $c_{66}$ are the five stiffness coefficients in Voigt notation of the stiffness tensor entering in the elasticity relationship between stress and strain. The orientation of the TI plane is defined by two angles as depicted in FIG. 2, the dip azimuth $\beta_A$ and the dip angle $\beta_D$. FIG. 2 depicts the material coordinate system for transverse isotropic medium with tilted symmetry axis (called TTI) where $\beta_D$ is the dip of the transverse isotropy plane and $\beta_A$ is the dip azimuth.

(b) Engineering notation: $E_v$, and $E_h$ are the vertical and horizontal Young's moduli (with respect to TI plane), $v_v$ and $v_h$ the vertical and horizontal Poisson's ratios, and $G_v$ the vertical shear moduli. The orientation of the TI plane is also defined by two angles as depicted in FIG. 2, the dip azimuth and the dip angle.

(c) Geophysics notation: Vp0 and Vs0 are respectively the compressional and shear velocities along the symmetry axis and $\epsilon$, $\delta$, $\gamma$ are three dimensionless parameters (called Thomsen parameters) and $\rho$ is the rock bulk density. The orientation of the TI plane is also defined by two angles as depicted in FIG. 2, the dip azimuth and the dip angle.

Initiation Pressure

In the present disclosure, the failure criterion used is a tensile strength criterion; therefore, the initiation pressure will be understood herein as the fluid pressure within the borehole resulting in the initiation of a tensile crack in a defect free subsurface material.

Workflow

Figure 3:
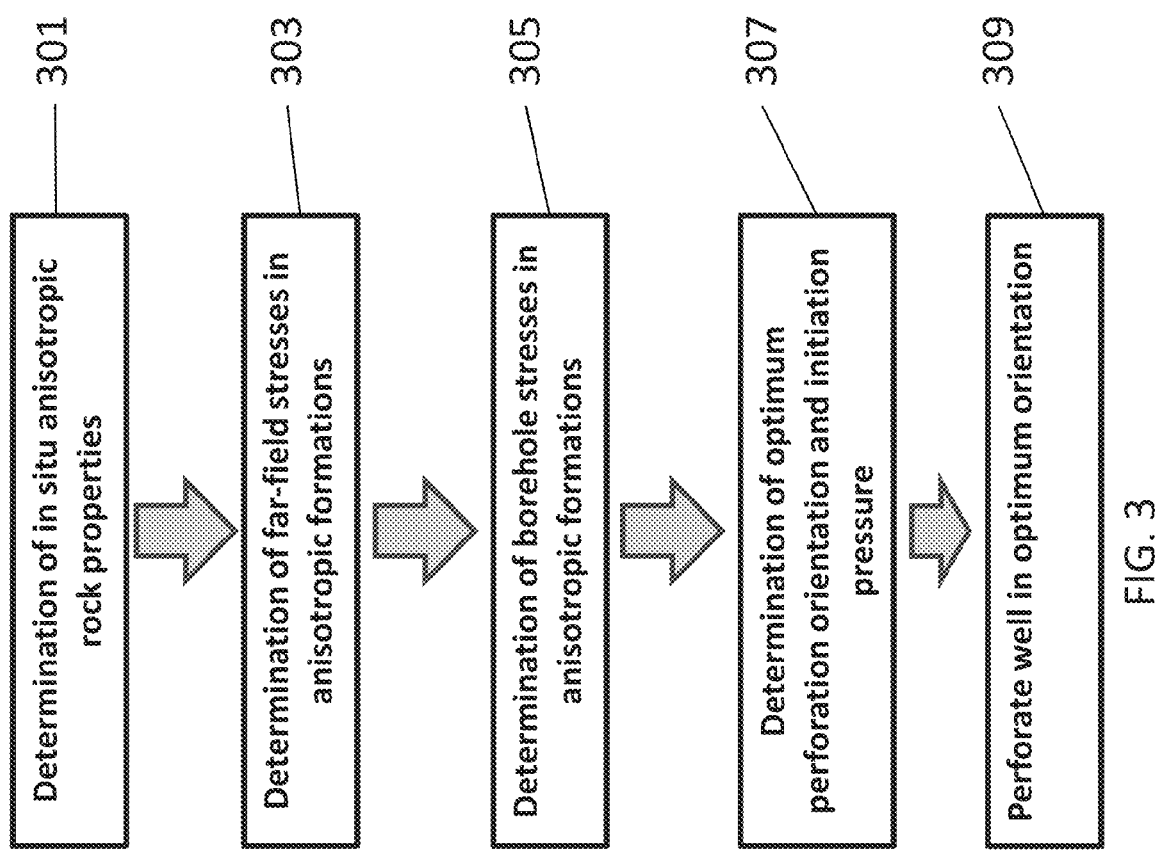
FIG. 3 illustrates a workflow for determining perforation orientations for hydraulic fracturing in anisotropic earth formations.

This subject disclosure considers the following improvements to take into account the anisotropic nature of the rocks and is further depicted in the workflow in FIG. 3. FIG. 3 illustrates an embodiment of the subject disclosure. FIG. 3 illustrates a workflow for determining perforation orientations for hydraulic fracturing in anisotropic earth formations. The workflow comprises a plurality of steps as illustrated in FIG. 3.

The first step is determination of anisotropic rock properties (301). This step involves (1) the acquisition of wireline or Logging While Drilling (LWD) sonic logs with all modes (monopole, dipole and Stoneley) with a 3D deviation survey, and (2) data processing to identify and estimate borehole sonic anisotropy. This step is performed using tools and procedures which have been described. See U.S. Pat. No. 6,714,480 to Sinha et al, entitled "Determination of anisotropic moduli of earth formations", U.S. Pat. No. 6,718,266 to Sinha et al., entitled "Determination of dipole shear anisotropy of earth formations", U.S. Patent Publication No.: 2009-0210160 to Suarez-Rivera et al. entitled "Estimating horizontal stress from three-dimensional anisotropy" and U.S. Pat. No. 8,117,014 to Prioul et al, entitled "Methods to estimate subsurface deviatoric stress characteristics from borehole sonic log anisotropy directions and image log failure directions". For TTI media, this leads to five elastic constants, e.g. $c_{11}$, $c_{33}$, $c_{13}$, $c_{44}$ and $c_{66}$, and two angles (the dip azimuth ($\beta_A$ and dip angle $\beta_D$ of the TI plane, as described above). The five elastic constants will define the stiffness tensor in the TI frame which can be inverted to get the compliance tensor rotated in the borehole frame and noted $a_{ij}$. This step can be completed for wells of arbitrary orientation.

The second step is the determination of far-field stresses in anisotropic formations (303). In embodiments of the subject disclosure it is assumed that the principal stress field ($\sigma1 > \sigma2 > \sigma3$) and the pore pressure $P_p$ are given but important considerations to estimate far-field stresses in anisotropic formations are considered. See United States Patent Publication No.: 2009-0210160 to Suarez-Rivera et al. entitled "Estimating horizontal stress from three-dimensional anisotropy". For example, this includes taking into account the anisotropy of the rock in the determination of the gravitational component of the stress field which leads to a relationship between the vertical and horizontal stresses for a transversely isotropic rocks with vertical axis of symmetry (VTI) or a titled axis of symmetry (TTI, see FIG. 2 above) such as described respectively by Thiercelin and Plumb (1994, SPE 21847), Amadei & Pan (1992, IJRMMS) and United States Patent Publication No.: 2009-0210160 to Suarez-Rivera et al. entitled "Estimating horizontal stress from three-dimensional anisotropy". The stress tensor is rotated in the TOH frame, to get $\sigma_{TOH}=[\sigma_{xx}^{TOH}\ \sigma_{xy}^{TOH}\ \sigma_{xz}^{TOH};\ \sigma_{xy}^{TOH}\ \sigma_{yy}^{TOH}\ \sigma_{yz}^{TOH}; \sigma_{xz}^{TOH}\ \sigma_{yz}^{TOH}\ \sigma_{zz}^{TOH}]$.

The third step is the determination of borehole stresses in an anisotropic formation (305). In embodiments of the subject disclosure a general solution for the stresses around a borehole in an anisotropic medium can be found using elasticity results from the superposition of the far field in-situ stress tensor $\sigma_{TOH}$ and the general expressions for the borehole-induced stresses ($\sigma_{bi}$). See B. Amadei, Rock Anisotropy and the theory of stress measurements. Lecture notes in engineering. Springer Verlag, 1983, S. G. Lekhnitskii, Theory of elasticity of an anisotropic body. MIR Publishers, Moscow, 1963, Gaede, O., Karpfinger, F., Jocker, J. & Prioul, R., Comparison between analytical and 3D finite element solutions for borehole stresses in anisotropic elastic rock, International Journal of Rock Mechanics & Mining Sciences, 2012, 51, 53-63. This step applies to arbitrary well orientation, arbitrary stress field and arbitrary elastic anisotropy of the formation.

The stress components in the plane orthogonal to the borehole are in Cartesian coordinates:

$\sigma_{xx,BH}=\sigma_{xx,TOH}+\sigma_{xx,bi}=\sigma_{xx,TOH}+2Re[\mu_1^2\phi'_1(z_1)+\mu_2^2\phi'_2(z_2)+\lambda_3\mu_3^2\phi'_3(z_3)]$ $\sigma_{yy,BH}=\sigma_{yy,TOH}+\sigma_{yy,bi}=\sigma_{yy,TOH}+2Re[\phi'_1(z_1)+\phi'_2(z_2)+\lambda_3\phi'_3(z_3)]$ $\sigma_{xy,BH}=\sigma_{xy,TOH}+\sigma_{xy,bi}=\sigma_{xy,TOH}+2Re[\mu_1\phi'_1(z_1)+\mu_2\phi'_2(z_2)+\lambda_3\mu_3\phi'_3(z_3)]$ $\sigma_{xz,BH}=\sigma_{xz,TOH}+\sigma_{xz,bi}=\sigma_{xz,TOH}+2Re[\lambda_1\mu_1\phi'_1(z_1)+\lambda_2\mu_2\phi'_2(z_2)+\lambda_3\mu_3\phi'_3(z_3)]$ $\sigma_{yz,BH}=\sigma_{yz,TOH}+\sigma_{yz,bi}=\sigma_{yz,TOH}+2Re[\lambda_1\phi'_1(z_1)+\lambda_2\phi'_2(z_2)+\phi'_3(z_3)]$ The stress component in the borehole axis direction is deduced from the generalized plane stress assumption using the other stress components and the compliance tensor component $a_{ij}$:

$$\sigma_{zz,BH} = \sigma_{zz,TOH} - \frac{1}{a_{33}}(a_{31}\sigma_{xx,bi}+a_{32}\sigma_{yy,bi}+a_{34}\sigma_{yz,bi}+a_{35}\sigma_{xz,bi}+a_{36}\sigma_{xy,bi})$$

The Cartesian stresses are then transformed into cylindrical coordinates to get $\sigma_{rr}$, $\sigma_{\theta\theta}$, $\sigma_{zz}$, $\sigma_{\theta z}$, $\sigma_{r\theta}$, $\sigma_{rz}$ These equations include the solutions to compute borehole stresses away from the borehole wall at a desired radial position into the formation.

The fourth step is the determination of an optimum perforation orientation (307). This step is the same as for an isotropic rock. The ideal perforation orientation for tensile initiation is found for the azimuthal position $\theta_t$ and the initiation pressure $P_w^{init}$ where the minimum principal stress at the borehole wall is given by $$\sigma_t = \frac{\sigma_{zz}+\sigma_{\theta\theta}}{2} - \sqrt{\left(\frac{\sigma_{zz}-\sigma_{\theta\theta}}{2}\right)^2 + \sigma_{\theta z}^2} = -To + Pp,$$

where To is the tensile strength of the rock and Pp is the pore pressure.

Steps three and four can be performed not only at the borehole wall but at any desired radial position within the formation using the appropriate stress concentration solutions from step 3.

The fifth step is to perforate a well in an optimum orientation (309). Knowing the optimum orientation, a perforation tool may be lowered into a well, the tool perforating the well in the direction of the optimum orientation obtained from the previous step.

In addition to the previous steps at a given depth point, it is understood that since anisotropic rock properties and far-field stress properties (from steps 1 and 2 above) can vary along the well, borehole stresses (step 3 above) will vary along the borehole and therefore step 3 can be used to select the depth points with similar near-wellbore stresses or similar wellbore fluid initiation pressure where to place perforation clusters for a given hydraulic fracturing stage in rock. Therefore, step 3 may be used with the borehole stresses to determine how to place hydraulic fracturing stages along the well.

EXAMPLE

If the following conditions are considered at a given depth for a hypothetical well:

The stress field is the result of step 1: $\sigma_v$=19.98 MPa, $\sigma_H$=19.9 MPa, $\sigma_h$=18.73 MPa, $P_p$=11.63 MPa. $\sigma_H$ is oriented in the North direction.

The anisotropic material properties are the result of step 2: $E_h$=3.55 GPa, $E_v$=2.13 GPa, $\upsilon_h$=0.4, $\upsilon_v$=0.29, $G_h$=1.27 GPa. The dip azimuth and dip angle are both zero here ($\beta_D=\beta_A=0$).

If we loop over a grid of well orientation with deviation angle between 0 and 90° and azimuth between 0 and 360°, we can perform steps 3 and 4 for each well orientation to get the ideal azimuthal position $\theta^{TTI}_t$ and the wellbore fluid initiation pressure $P_w^{init}{}_{TTI}$. If step 3 of this workflow is replaced by its isotropic version (described in the background) using the horizontal Poisson's ratio as a material property, we can compute azimuthal position $\theta^{ISO}_t$ and the wellbore fluid initiation pressure $P_w^{init}{}_{ISO}$ and compare the difference between those two angles. Results on FIG. 4A-4C show that the difference $|\theta^{TTI}_t-\theta^{ISO}_t|$ due to the anisotropy of the material orientation which can be up to 45° in this example (Difference between $P_w^{init}{}_{TTI}$ and $P_w^{init}{}_{ISO}$ not shown here, for such details, we refer to Prioul, R., Karpfinger, F., Deenadayalu, C. & Suarez-Rivera, R, Improving Fracture Initiation Predictions on Arbitrarily Oriented Wells in Anisotropic Shales, Society of Petroleum Engineers, SPE-147462, 2011, 1, 1-18).

Figure 4A:
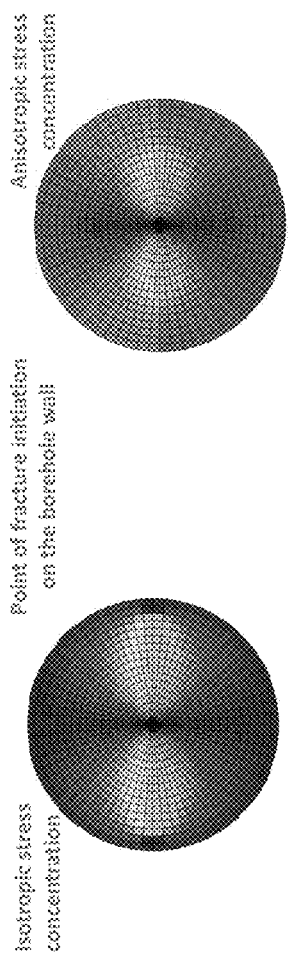
FIG. 4 illustrates an example of a perforation orientation angle around a borehole.
Figure 4B:
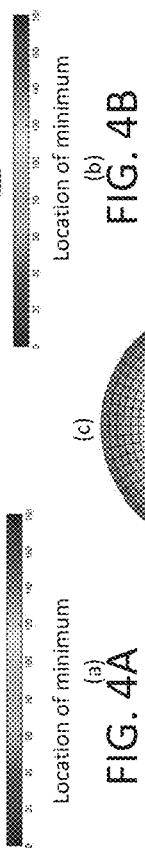
Figure 4C:
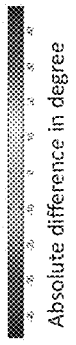

FIG. 4A-C depicts examples of an optimum perforation orientation angle around a borehole computed using in FIG. 4A isotropic stress concentration and in FIG. 4B anisotropic stress concentrations. The difference between FIG. 4A and FIG. 4B is shown in FIG. 4C. Results are plotted on a polar grid where each point of the grid correspond to well orientation, with radial variation corresponding to well deviation (from 0 to 90) and azimuthal variation corresponding to well azimuth (from 0 to 360) with the convention of clockwise positive rotation from North to East.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method for determining a perforation orientation for hydraulic fracturing in an anisotropic earth formation comprising:
    determining anisotropic rock properties;
    determining far-field stresses in the anisotropic earth formation;
    determining borehole stresses in the anisotropic earth formation; and
    determining an optimum perforation orientation and optimum wellbore fluid initiation pressure based upon the determining anisotropic rock properties, far-field stresses and the borehole stresses, and wherein the determining an optimum perforation orientation uses a difference between isotropic stress concentration and anisotropic stress concentrations.

2. The method according to claim 1 further comprising perforating a well in the determined optimum perforation orientation.

3. The method according to claim 1 wherein the determining anisotropic rock properties further comprises:
    acquisition of a sonic log with a 3D deviation survey;
    data processing to characterize borehole sonic anisotropy.

4. The method according to claim 3 wherein the acquisition of the sonic log uses a monopole mode.

5. The method according to claim 3 wherein the acquisition of the sonic log uses a dipole mode.

6. The method according to claim 3 wherein the acquisition of the sonic log uses a monopole mode, a dipole mode or a Stoneley mode, or any combination of.

7. The method according to claim 2 wherein the well is a deviated well.

8. The method according to claim 2 wherein the well is a horizontal well.

9. The method according to claim 2 wherein the well is a vertical well.

10. The method according to claim 2 wherein the perforating the well in the optimum perforation orientation is performed with at a shaped charge.

11. A method for perforating a well traversing a subterranean area including one or more transversely isotropic formations with a tilted axis of symmetry comprising:
    determining formation properties;
    determining far-field stresses in the formation;
    determining borehole stresses in the formation;
    determining an optimum perforation orientation and optimum wellbore fluid initiation pressure based upon the determining formation properties, far-field stresses and borehole stresses, and wherein the determining an optimum perforation orientation uses a difference between isotropic stress concentration and anisotropic stress concentrations; and
    perforating the well in the determined optimum perforation orientation.

12. The method according to claim 11 wherein the well comprises one or more portions of a group consisting of a deviated portion, a horizontal portion, or a vertical portion.

13. The method according to claim 11 wherein the perforating of the well is done with one or more shaped charges.

14. The method according to claim 11 further comprising:
    determination of borehole stresses in the well at different depths;
    positioning perforation clusters at one or more depth points with borehole stresses similar to a previous perforation depth; and
    perforating the well at the one or more depth points for placement of hydraulic fracturing stages along the well.

15. A method for hydraulic fracturing in an anisotropic earth formation comprising:
    determining anisotropic rock properties;
    determining far-field stresses in the anisotropic earth formation;
    determining borehole stresses in the anisotropic earth formation;
    determining an optimum perforation orientation and optimum wellbore fluid initiation pressure based upon the determining formation properties, far-field stresses and borehole stresses, and wherein the determining an optimum perforation orientation uses a difference between isotropic stress concentration and anisotropic stress concentrations;
    perforating a well in the determined optimum perforation orientation; and
    hydraulic fracturing the well at a pressure at least at the optimum wellbore fluid initiation pressure.

16. The method according to claim 15 wherein the well comprises one or more portions of a group consisting of a deviated portion, a horizontal portion, or a vertical portion.

17. The method of claim 15 in which the determining anisotropic rock properties comprises acquisition of wireline sonic logs with all modes with a 3D deviation survey.

18. The method of claim 15 in which the determining anisotropic rock properties comprises acquisition of logging while drilling sonic logs with all modes with a 3D deviation survey.

19. The method of claim 15 in which the perforating of the well comprises one or more shape charges.

20. The method according to claim 17 wherein the acquisition of the sonic log uses a monopole mode, a dipole mode or a Stoneley mode, or any combination of.

* * * * *